Figure 1:
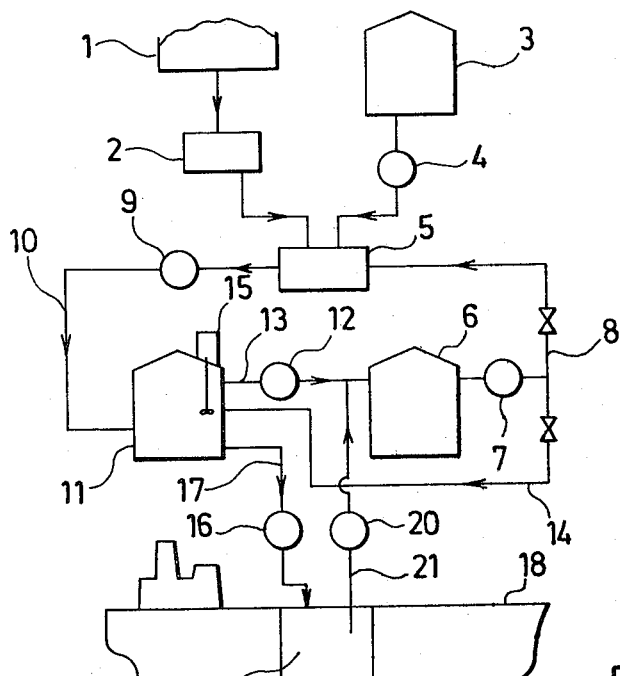

United States Patent [19]

Nakabayashi et al.

[11] 4,239,426

[45] Dec. 16, 1980

[54] METHOD OF TRANSPORTING AND STORING MIXED FUEL AND PLANT THEREFOR

[75] Inventors: Yasuyuki Nakabayashi, Yokohama; Kenichi Nagata, Ichihara; Shozo Fukuda, Nagasaki, all of Japan

[73] Assignees: Mitsubishi Jukogyo Kabushiki Kaisha; Electric Power Development Co. Ltd.; Misui Engineering & Shipbuilding Co. Ltd., all of Tokyo, Japan

[21] Appl. No.: 928,433

[22] Filed: Jul. 27, 1978

[51] Int. Cl.³ .............................................. B65G 53/30
[52] U.S. Cl. ........................................ 406/197; 44/51; 137/13
[58] Field of Search ................ 302/66; 137/13; 44/51; 406/197

[56] References Cited

U.S. PATENT DOCUMENTS

| | | | |
|---|---|---|---|
| 3,940,184 | 2/1976 | McCain | 302/66 |
| 4,045,092 | 8/1977 | Keller | 44/51 |

*Primary Examiner*—Jacqueline V. Howard
*Attorney, Agent, or Firm*—Toren, McGeady and Stanger

[57] ABSTRACT

A method of transporting by conveyance through pipelines and storing a fluid mixed fuel consisting of pulverized coal and a liquid fuel is characterized in that, during transportation, the mixed fuel is conveyed as a fluid of low viscosity with an increased liquid fuel proportion and, while in storage, the liquid fuel proportion is kept small by extraction of the liquid fuel alone from the mixed fuel in the storage tank. Arrangements for practicing the method are also provided.

5 Claims, 2 Drawing Figures

METHOD OF TRANSPORTING AND STORING MIXED FUEL AND PLANT THEREFOR

This invention relates to improvements in method and arrangements for transporting and storing a mixed fuel consisting, for example, of pulverized coal and a liquid fuel to be used as fuel for the boiler of a thermal power station or the like.

As fuel for coal-fired thermal power stations, coal in the lump form is cumbersome to handle and therefore is costly. In an attempt to solve this problem, use of a fluid mixture of finely divided coal and crude or heavy oil in a ratio by weight of approximately 50:50 (the coal-oil mixture being hereinafter called "COM" for simplicity) has been proposed.

The technique is in most cases employed at the origins of coal distant beyond the seas from the places of consumption. Coal is dried, pulverized, and mixed with crude or heavy oil at site. Since the simple mixture is often difficult to handle because of coal sedimentation or too high viscosity, usually some additive or 5-15% water is added to give a COM of improved properties. A variety of surfactants and other agents have been utilized as additives in endeavors to improve the dispersibility of coal and water.

The COM thus prepared at a remote coal mine is carried by a ship to a port of destination close to the thermal power station where it is to be consumed, and is unloaded and temporarily stored in a storage tank. Then, an additional quantity of pulverized coal is introduced into the tank to increase the coal proportion of the COM to an optimum mixture ratio predetermined for combustion efficiency as well as from the viewpoint of economics. The COM in the optimum mixture ratio is forced by a fuel oil pump to the burner of a boiler for combustion, in the same manner as crude or heavy oil. The system has, however, indicated the following shortcomings:

(1) The increased coal proportion raises the viscosity of the COM, and the poor fluidity results in excessive pressure loss. Especially where brown coal or similar porous coal is used, it tends to absorb more oil than oridinary coal and hence require a large proportion of oil to maintain the fluidity of the mixture. However, the relative reduction of the coal proportion in the COM will lower the coal transportion efficiency.

(2) The additive must usually account for 0.01-0.7% of the total weight of the COM, or a proportion not negligible in point of cost.

The additive is often in the form of an aqueous solution, and the COM containing such an additive and therefore having a large moisture content will lower the boiler efficiency as it burns. For example, 10% water added to the fuel mixture will decrease the boiler efficiency by about 0.5%.

(3) For added fluidity the COM in many cases has to be heated. However, the additive in the form of an aqueous solution will no longer act as such at temperatures above 100° C. The heater must, therefore, use hot water rather than steam. This is an economic disadvantage.

(4) The COM in transmit may separate into coal and oil, with sedimentation of coal, upon subjection to vibration of the carrying vessel or vehicle. When this happens, some countermeasure must be taken; otherwise, unloading will become difficult.

(5) The mixture of coal, oil, additive, and water is rather too viscous to handle for quantity production on an industrial scale.

The present invention is proposed with the view to overcoming the afore-described difficulties. It thus provides a method of transporting by conveyance through pipelines and storing a fluid mixed fuel consisting of pulverized coal and a liquid fuel, characterized in that, during transportation, the mixed fuel is conveyed as a fluid of low viscosity with an increased liquid fuel proportion and, while in storage, the liquid fuel proportion is kept small by extraction of the liquid fuel alone from the mixed fuel in the storage tank. The plant to be directly used for practicing the method of the invention is one for transporting by conveyance through pipelines and storing a fluid mixed fuel consisting of pulverized coal and crude or heavy oil, characterized by a first vessel equipped with means for mixing and agitating the pulverized coal and liquid fuel introduced therein, a second vessel installed at a point of destination, pipelines connecting the first and second vessels for conveyance of the mixed fuel, means for extracting the liquid fuel alone from the second vessle, a third vessel for storing the liquid fuel extracted from the second vessel, and means for supplying the liquid fuel from the third vessel to the first vessel.

The present invention has resulted from the realization that the disadvantages of the prior art systems for COM transportation and storage arise from the fluidity of the COM kept unchanged while in transmit and in storage and that those disadvantages could be eliminated by varying the fluidity with the periods of transportation and storage.

The technique of pulverizing coal, mixing the pulverized coal with heavy oil or other liquid fuel, and transporting the mixture is quite advantageous over the common practice of shipping coal in lump form, because of by far the greater transportation efficiency and of the possibility of conveniently adjusting the mixture ratio optimumly for combustion and directly burning the mixture as a fuel whenever the necessity arises. Moreover, whether in transportation or in storage, the limitations of the mixture ratio are negligible. The present invention achieves further improvement on this technique through the adjustment of the mixture ratio of coal and liquid fuel during transportation and storage.

According to the method of the invention, a COM to be transported is made fluid and less viscous by increasing the ratio of the liquid fuel to the pulverized coal and, for storage, the liquid fuel alone is extracted from the COM in the storage tank to reduce its proportion.

The good fluidity of the COM during transportation permits both excessive pressure loss in pipe flow and sedimentation of coal in the piping to be avoided, thus achieving a satisfactory transportation efficiency. In storage, the COM can maintain a high proportion of coal, which, in turn permits a saving of the storage space.

With the plant of the invention devised as arrangements for directly practicing the transportation and storage method of the invention, pulverized coal and a liquid fuel are introduced into the first vessel and are mixed therein by agitator means associated with the vessel to prepare a mixed fuel, and then a liquid fuel stored in the third vessel is conveyed to the first vessel to decrease the proportion of coal so that the mixed fuel may attain desired fluidity suited for conveyance through pipelines.

Next, the mixed fuel is transferred from the first to the second vessel via a line, stored in the latter, and the liquid fuel alone is extracted from the second vessel and is separately stored in the third vessel. The liquid fuel thus stored in th third vessel is ready to be sent to the first vessel to make the mixed fluid therein fluid enough to be delivered out.

In the plant of the invention, therefore, the mixed fuel prepared in the first vessel can be imparted, when desired, with sufficient fluidity for pipeline transportation. In the storage tank that serves as the second vessel, the proportion of coal can be increased by extracting the liquid fuel from the mixture, and hence the total storage volume can be minimized. Further, because the liquid fuel drawn out of the second vessel and stored in the third vessel is recycled to the first vessel to improve the fluidity of the mixed fuel therein, the transportation and storage of the mixed fuel can be accomplished in an integral and organic way by a simplicity plant.

As described above, the method and plant according to the invention can maintain a mixed fuel in transit in an adequately fluid state. Therefore, the addition of a surfactant or other additive or water is not essential, and the above-mentioned drawbacks that would arise from the use of such an additive can be avoided.

The liquid fuel to be mixed with coal is, for example, crude or heavy fuel oil. Light oil, kerosene, or the like may also be used. Methanol or other industrial alcohol is utilizable as well.

In consideration of the special conditions of the transportation area, economics and efficiency of transportation, and other pertinent factors, the liquid fuel to be employed in accordance with the invention may be of two or more different types to be alternately used while the fuel mixture is in transit or depending on whether the usage is for transportation or for storage of the mixture.

Figure 2:
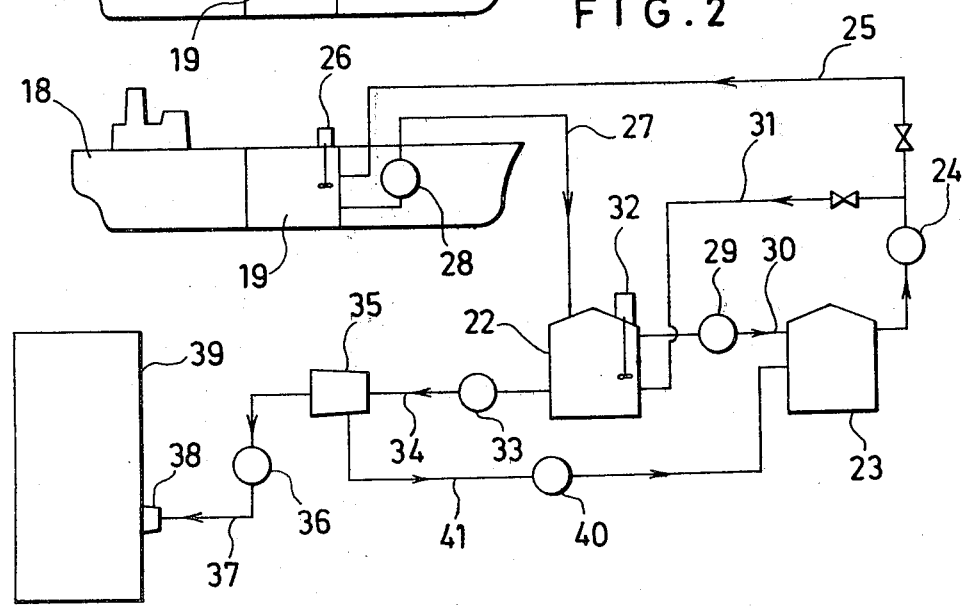

Now an embodiment of the method and the plant of the invention will be described with reference to the drawings, in which:

FIG. 1 is a flow chart of arrangements for preparing a COM and loading a tanker with the same; and FIG. 2 is a flow chart of arrangements for transporting the COM from the tanker to the boiler of a thermal power station.

FIGS. 1 and 2 may be understood to show systematically the method of preparing a COM at a coal mine somewhere outside Japan, for example, transporting the product by sea to Japan, and then conveying the same by land to a thermal power station in the country.

Referring now to FIG. 1, coal stored in a source location or yard 1 in the vicinity of the coal mine is carried by a conveyor or the like to a pulverizing mill 2, where it is ground to a size (for example $\phi$ 70$\mu$—6 mm) suited for transportation as a component of a COM. The pulverized coal is transferred to a container or vessel 5 for COM preparation. Meanwhile, crude or heavy oil too is supplied from a tank 3 by a pump 4 to the vessel 5.

The COM preparation vessel 5 is equipped with conventional agitator means, whereby the pulverized coal is mixed with the crude or heavy oil. From an oil adjusting tank 6 an additional quantity of crude or heavy oil is forced by a pump 7 through a line 8 into the COM preparation vessel 5. The addition increases the proportion of crude or heavy oil in the COM and renders the mixture fluid enough for smooth conveyance through pipelines. At this time, the coal-oil mixing ratio by weight in the COM (hereinafter called "coal-oil ratio") was, for example, 40:60–50:50.

The COM thus adjusted to a viscosity adequate for pipeline conveyance is forced by a pump 9 through a line 10 to a COM storage tank 11 built near a wharf of the loading port or transfer point facility.

Since the COM conveyed up to the storage tank 11 is free of moisture and additive such as a surfactant, the pulverized coal naturally separates out from the crude or heavy oil and settles down on the bottom of the tank. The oil separately left in the upper portion of the mixture is conveyed by a pump 12 through a line 13 to the adjusting tank 6 for storage. At this time, the coal-oil ratio was, for example, 65:35–85:15.

The crude or heavy oil stored in the adjusting tank 6 is added, in a necessary amount, to the vessel 5 for preparation of the COM. The additional supply of oil decreases the viscosity and improves the fluidity of the COM for easy conveyance through the pipelines.

When the COM is to be transported from the COM storage tank 11 to a tanker 18, it is necessary to stir up the coal settled in the tank and decrease the viscosity of the mixture to a level low enough for retransportation. To attain this end, the oil fromm the tank 6 is supplied to the tank 11 by the pump 7 through a line 14. The tank 11 is equipped with an agitator 15, which is actuated when necessary to fluidize the COM again to the viscosity suited for conveyance through the lines. Now the pump 16 is started and the COM with the reduced viscosity is pumped into the hold 19 of the ship 18 through a line 17. During transportation, the coal-oil ratio was, for example, 40:60–50:50.

Free of any additive and moisture, the COM in the hold 19 readily separates into coal and oil. The coal having settled down away from oil, the supernatant oil portion is returned to the tank 6 by a pump 20 through a line 21. Should the separation by sedimentation appear to take too much time, a rapid separator, for example, a centrifuge, may be employed. The coal-oil ratio of the COM in the hold 19 was, for example, 65:35–85:15.

FIG. 2 is a flow chart that starts with the arrival of the tanker 18 at a port near the power station to which the COM she carries is to be delivered. When the COM is to be transferred from the hold 19 of the vessel 18 to a COM storage tank 22 ashore, an adequate quantity of crude or heavy oil is first supplied from an adjusting tank 23 to the hold 19 by a pump 24 through a line 25. Then, by an agitator 26 installed on the hold 19, the COM in which coal has settled down is stirred and fluidized again, to be unloaded in the form of a less viscous fluid to the offshore tank 22 by a pump 28 through a line 27. During transportation, the coal-oil ratio was, for example, 40:60–50:50. In the storage tank 22 the coal settles down, leaving oil behind, and the supernatant oil portion is returned to the tank 23 by a pump 29 through a line 30.

When supplying the COM from the tank 22 to the boiler 39 of a thermal power station, the crude or heavy oil in the tank 23 is first transferred to the tank 22 by the pump 24, this time through a line 31. An agitator 32 associated with the tank 22 is actuated, and the COM, thus again changed to be a fluid with low viscosity and improved fluidity, is sent to a mechanical separator 35, such as a centrifuge, installed near the boiler 39, by a pump 33 through a line 34. The COM is then divided by the separator 35 into two portions with high and low coal mixture ratios. The portion with the larger coal proportion adjusted to a coal-oil ratio (for example, 60:40–95:5) suited for injection through a burner is forced by a fuel pump 36 though a line 37 into the burner 38, to be burned inside the boiler 39. The other portion with the smaller coal proportion is sent by a pump 40 through a line 41 back to the adjusting tank 23 and is stored therein.

With the plant of the invention, at either port of unloading or discharging, the COM is transported after its viscosity has been decreased and its fluidity increased by the addition, with stirring, of crude or heavy oil from the adjusting tank 6 or 23. Therefore, the mixture is conveyed smoothly with a minimum of pressure loss. When the COM is to be stored in the storage tank 11 or 22 or in the tanker hold 19, it is separated in advance into oil and coal, and the oil is returned to the adjusting tank 6 or 23. This permits the use of storage tanks of accordingly reduced capacities. Also, by regulating the quantity of oil being returned to the adjusting tank 6 or 23, it is possible to provide a coal-oil ratio that will preclude the consolidation of settled coal due to vibration or other action of the storage tank 11 or 22 or of the hold 19.

Further, the separation by a mechanical separator, such as centrifuge, of the COM with low viscosity conveyed through lines is an easy way of adjusting the COM to a coal-oil ratio having a high coal proportion and yet suited for injection through the burner. The COM so adjusted in ratio can be used direct as a fuel for the boiler.

As described above, the plant according to this invention eliminates the disadvantages of the prior art installations by preadjusting the coal-oil ratio of a COM to optimum values for the respective stages of transportation, storage, and combustion. The COM with the sedimentation of coal in the storage tank can be readily readjusted to a viscosity adequate for transportation through pipelines. Addition of water, surfactant, or other additive is not essential, and the afore-said disadvantages associated with the use of such an additive can be avoided.

What is claimed is:

1. A method of preparing and transporting a coal-oil mixture comprising mainly coal and one of crude or heavy oil comprising the steps of taking coal at a source location and pulverizing the coal to a particle size of approximately 70μ—6 mm, transferring the pulverized coal at the source location into a container, supplying one of crude or heavy oil into the container and mixing the oil with the pulverized coal, adjusting the proportion of coal and oil in the container into the range of 40:60–50:40 for affording smooth conveyance of the coal-oil mixture, free of moisture and additive and with the ratio of coal and oil in the range of 40:60–50:50 from the container through a pipeline to a transfer point facility, collecting the conveyed coal-oil mixture in a vessel at a transfer point facility and adjusting the ratio of coal to oil in the vessel in the range of 65:35–85:15 by settling the pulverized coal and separating the coal from the oil and storing the adjusted coal-oil mixture in the vessel until the mixture is to be transported from the transfer point facility and storing the oil in the separate tank, adding oil to the adjusted coal-oil mixture in the vessel to bring the mixture into the range of 40:60–50:50, and transporting the coal-oil mixture.

2. A method, as set forth in claim 1, including after transporting the coal-oil mixture, the steps of storing the coal-oil mixture in a receptacle in the range of 65:35–85:15 and storing oil separated from the mixture in a separate tank, increasing the ratio of coal to oil of the stored mixture in the receptacle for changing the mixture into a fluid with low viscosity and improved fluidity, transferring the coal-oil mixture changed into a more fluid state from the storage receptacle into another container and adjusting the mixture in the another container for use as a fuel in a burner with the ratio of the coal to oil in the range of 60:40–95:5.

3. A method, as set forth in claim 2, including the step of adjusting the coal-oil mixture for use as fuel in the burner by separating the coal-oil mixture into a high and low coal mixture ratio with the high coal mixture ratio being in the range of 60:40–95:5 and supplying the high coal mixture ratio into the burner.

4. A plant for preparing and transporting a coal-oil mixture comprising a pulverizing mill located at a source location for grinding coal to a particle size range of 70μ—6 mm suitable for transportation as a component of the coal-oil mixture, a coal-oil mixture preparation vessel connected to said pulverized mill for receiving pulverized coal therefrom, a first tank for one of crude or heavy oil connected to said preparation vessel for supplying one of crude or heavy oil thereto, a first oil adjusting tank connected to said preparation vessel for selectively receiving oil from or supplying oil to said preparation vessel, a first coal-oil mixture tank located at a transfer point facility, means for conveying a fluid coal-oil mixture from said preparation vessel at the source location to said first storage tank at the transfer point facility, means for withdrawing oil separated in said first storage tank from the coal-oil mixture to said first oil adjusting tank, and means for conveying fluidized coal-oil mixture from said storage tank at the transfer point facility to a point of use.

5. A plant, as set forth in claim 4, including a burner located at the point of use, said means for conveying fluidized coal-oil mixture comprises a second storage tank for receiving said coal-oil mixture from the transfer point facility, a second oil tank connected to said storage tank for receiving oil from or for supplying oil to said second storage tank, an agitator in said second storage tank for adjusting the coal and oil, a mechanical separator connected to said second storage tank for receiving a supply of fluidized coal-oil mixture therefrom, said separator arranged to separate the coal-oil mixture into a high coal mixture ratio component and a low coal mixture ratio component and means for conveying the high coal mixture ratio component from said separator to said burner.

* * * * *